(12) United States Patent
Allen et al.

(10) Patent No.: US 9,731,239 B2
(45) Date of Patent: Aug. 15, 2017

(54) FLUOROPOLYMER ARTICLE FOR BACTERIAL FILTRATION

(71) Applicant: W. L. Gore & Associates, Inc., Newark, DE (US)

(72) Inventors: John C. Allen, Lincoln Univeristy, PA (US); Christopher J. Shultz, Baldwin, MD (US); Brian C. Martonik, Oxford, PA (US); Kenneth S. Zukor, Havre de Grace, MD (US)

(73) Assignee: W. L. Gore & Associates, Inc., Newark, DE (US)

( * ) Notice: Subject to any disclaimer, the term of this patent is extended or adjusted under 35 U.S.C. 154(b) by 316 days.

(21) Appl. No.: 14/570,175

(22) Filed: Dec. 15, 2014

(65) Prior Publication Data

US 2016/0166965 A1  Jun. 16, 2016

(51) Int. Cl.
*B01D 53/22* (2006.01)
*B01D 46/00* (2006.01)
(Continued)

(52) U.S. Cl.
CPC ......... *B01D 46/0028* (2013.01); *B01D 29/56* (2013.01); *B01D 63/08* (2013.01);
(Continued)

(58) Field of Classification Search
CPC .... B01D 46/0028; B01D 29/56; B01D 63/08; B01D 65/003; B01D 69/06;
(Continued)

(56) References Cited

U.S. PATENT DOCUMENTS

| 3,953,566 A | 4/1976 | Gore |
| 4,392,958 A | 7/1983 | Ganzi et al. |

(Continued)

FOREIGN PATENT DOCUMENTS

| CN | 201609962 | 10/2010 |
| EP | 2377598 | 10/2011 |
| WO | WO91/08829 | 6/1991 |

OTHER PUBLICATIONS

Meltzer, Theodore H., Filter Porosity Characteristics, Filtration in the Pharmaceutical Industry. New York: Marcel Dekker, 1986.
(Continued)

*Primary Examiner* — Anthony Shumate
(74) *Attorney, Agent, or Firm* — Amy L. Miller (57) ABSTRACT

A filtration article including a composite filtration structure, a seal region positioned within the composite filtration structure, and an attachment weld that interconnects the seal region and an outer casing is provided. The composite filtration structure includes a stacked filter material including at least two fluoropolymer membranes and a support layer. The support layer may be formed of a thermoplastic or thermoset polymer. When heated, the polymer in the support layer melts and flows into the fluoropolymer membranes. In exemplary embodiments, the polymer is imbibed through the thickness of the fluoropolymer membranes. The attachment weld may be positioned at any location within the seal region so long as the attachment weld is positioned a distance from the outer periphery of the composite filtration structure. The filtration article is small in size, is lightweight, and may be used as a sterilizing grade filter. Methods of producing the filtration article also provided.

38 Claims, 5 Drawing Sheets

(51) Int. Cl.
  *B01D 29/56* (2006.01)
  *B01D 63/08* (2006.01)
  *B01D 65/00* (2006.01)
  *B01D 69/06* (2006.01)
  *B01D 69/10* (2006.01)
  *B01D 69/12* (2006.01)
  B01D 46/54 (2006.01)
  B01D 46/10 (2006.01)
  B01D 46/12 (2006.01)

(52) U.S. Cl.
  CPC ........... *B01D 65/003* (2013.01); *B01D 69/06* (2013.01); *B01D 69/10* (2013.01); *B01D 69/12* (2013.01); B01D 46/0002 (2013.01); B01D 46/0023 (2013.01); B01D 46/10 (2013.01); B01D 46/12 (2013.01); B01D 46/543 (2013.01); B01D 2265/04 (2013.01); B01D 2271/02 (2013.01); B01D 2275/10 (2013.01); B01D 2313/04 (2013.01)

(58) Field of Classification Search
  CPC  B01D 46/0002; B01D 46/0023; B01D 46/10; B01D 46/12; B01D 46/543; B01D 2265/04; B01D 2271/02; B01D 2313/04; B01D 69/10; B01D 69/12; B01D 2275/10
  See application file for complete search history.

(56) References Cited

U.S. PATENT DOCUMENTS

| | | | |
|---|---|---|---|
| 4,501,663 A | 2/1985 | Merrill | |
| 4,512,892 A | 4/1985 | Ganzi et al. | |
| 4,579,698 A | 4/1986 | Meyering et al. | |
| 4,767,426 A * | 8/1988 | Daly | B01D 39/2024 156/86 |
| 5,019,140 A | 5/1991 | Bowser et al. | |
| 5,183,545 A | 2/1993 | Branca et al. | |
| 5,254,143 A | 10/1993 | Anazawa et al. | |
| 5,269,917 A | 12/1993 | Stankowski | |
| 5,326,449 A * | 7/1994 | Cunningham | C12Q 1/002 204/403.09 |
| 5,439,587 A | 8/1995 | Stankowski et al. | |
| 5,476,589 A | 12/1995 | Bacino | |
| 5,516,564 A | 5/1996 | Root et al. | |
| 5,571,413 A | 11/1996 | Mogami et al. | |
| 5,708,044 A | 1/1998 | Branca | |
| 5,814,405 A | 9/1998 | Branca et al. | |
| 5,846,421 A | 12/1998 | Ohtani | |
| 5,928,414 A * | 7/1999 | Wnenchak | B01D 39/1692 55/302 |
| 5,976,380 A | 11/1999 | Moya | |
| 6,541,589 B1 | 4/2003 | Baillie | |
| 7,306,729 B2 | 12/2007 | Bacino et al. | |
| 7,531,611 B2 | 5/2009 | Sabol et al. | |
| 8,268,900 B2 * | 9/2012 | Kotera | C08J 5/2281 264/176.1 |
| 2002/0093192 A1 | 7/2002 | Matkovich | |
| 2003/0000874 A1 | 1/2003 | Proulx et al. | |
| 2003/0010213 A1 | 1/2003 | Gerner et al. | |
| 2003/0031600 A1 | 2/2003 | Manganini et al. | |
| 2003/0089664 A1 | 5/2003 | Phillips | |
| 2003/1217957 | 11/2003 | Bowman, Jr. et al. | |
| 2004/0171302 A1 | 9/2004 | Matkovich et al. | |
| 2004/0251195 A1 * | 12/2004 | Oka | A61M 1/3633 210/489 |
| 2005/0170159 A1 * | 8/2005 | Ramsey | B01D 39/1661 428/212 |
| 2006/0138038 A1 | 6/2006 | Proulx et al. | |
| 2009/0093602 A1 | 4/2009 | Ford | |
| 2009/0139405 A1 * | 6/2009 | Schwarz | B01D 39/163 96/17 |
| 2009/0191620 A1 * | 7/2009 | Martin | C12M 23/08 435/294.1 |
| 2009/0266048 A1 * | 10/2009 | Schwarz | B01D 39/1692 60/39.092 |
| 2010/0015492 A1 * | 1/2010 | Katayama | H01M 8/004 429/463 |
| 2010/0248324 A1 | 9/2010 | Xu et al. | |
| 2011/0212294 A1 | 9/2011 | Kato | |
| 2011/0285038 A1 * | 11/2011 | Lin | A61M 1/1698 261/101 |
| 2012/0035283 A9 | 2/2012 | Xu et al. | |
| 2012/0091072 A1 | 4/2012 | Kozlov et al. | |
| 2014/0212612 A1 | 7/2014 | Sbriglia | |
| 2014/0262894 A1 * | 9/2014 | Jansen | B01D 69/12 206/439 |
| 2015/0306539 A1 * | 10/2015 | Yamato | B01D 53/228 429/145 |

OTHER PUBLICATIONS

Levy, R.V. and Jornitz, M.W., Types of Filtration, Advances in Biochemical Engineering/Biotechnology, Merlin, Springer, 2006, N, Pag.

* cited by examiner

FLUOROPOLYMER ARTICLE FOR BACTERIAL FILTRATION

FIELD

The present disclosure relates generally to bacterial filtration, and more specifically to a multilayered filtration article that meets bacterial retention requirements of a sterilizing grade filter.

BACKGROUND

Sterilizing grade filters for small scale gas lines, air venting, and liquid applications in the pharmaceutical industry are well known. Typical applications include the sterile venting and filtration associated with tanks, flasks, bottles, and flexible bio-reactors. Known filters that provide bacterial filtration typically employ one or more fluoropolymer membranes and are in the form of membrane disks attached to a plastic filter casing or a capsule. In order to improve flow rate, attempts were made to use thinner membranes for bacterial retention. However, such thin membranes, although highly retentive, typically require the use of at least one protective layer to enable integration into a filtration device, such as a capsule or casing. Achieving an integral filtration article with an adequate seal using dissimilar layers is problematic due to incomplete penetration of the sealant through the entire cross section of all the filtration layers.

As it is desirable to improve the flow rate per unit area of filtration without compromising bacterial retention characteristics, there remains a need for a composite filtration structure that achieves integration into a filtration article, is small in size, is lightweight, and which provides high flow rate per unit area while meeting the bacterial retention requirements of a sterilizing grade filter.

SUMMARY

One embodiment of the invention relates to a filtration article that includes a composite filtration structure, a seal region surrounding the composite filtration structure, and an attachment weld interconnecting the seal region and an outer casing. The attachment weld affixes the composite filtration structure to the outer casing. Additionally, the attachment weld extends a distance from an outer periphery of the composite filtration structure and within the seal region. In exemplary embodiments, the seal region and attachment weld are embedded therethrough with a polymer material. The composite filtration structure includes a support layer and a stacked filter material. The stacked filter material includes at least two fluoropolymer membranes positioned adjacent to each other. The fluoropolymer membranes may be positioned in a stacked or layered configuration or they may be laminated together. In one embodiment, at least one of the fluoropolymer membranes is an expanded polytetrafluoroethylene membrane. The support layer may be, for example, a woven structure, a nonwoven structure, mesh, a perforated polymeric film, or a knit structure made using thermoplastic polymeric materials.

A second embodiment of the invention relates to a filtration article that includes a composite filtration structure, a seal region surrounding the composite filtration structure, and an attachment weld interconnecting the seal region and an outer casing. The attachment weld affixes the composite filtration structure to the outer casing and extends a distance from an outer periphery of the composite filtration structure within the seal region. In exemplary embodiments, the seal region and attachment weld are embedded therethrough with a polymer material. The composite filtration structure includes a support layer and a stacked filter material. In at least one embodiment, the stacked filter material includes at least a first fluoropolymer membrane, a second fluoropolymer membrane, and a third fluoropolymer membrane. In one exemplary embodiment, the second fluoropolymer membrane is positioned between the first and third fluoropolymer membranes and has a bubble point that is different from the first and third fluoropolymer membranes. The fluoropolymer membranes may be positioned in a stacked or layered configuration or they may be laminated together. In exemplary embodiments, at least one of the fluoropolymer membranes is an expanded polytetrafluoroethylene membrane. The support layer may be a porous non-woven, woven mesh, a perforated polymeric film, or knit thermoplastic polymer.

A third embodiment of the invention relates to a method of forming a filtration article that includes (1) constructing a composite filtration structure, (2) sealing the composite filtration structure to form a seal region and form a preform, (3) placing the preform in an outer casing, and (4) welding the composite filtration structure to form an attachment weld that extends a distance from an outer periphery of the composite filtration structure and within the seal region. The composite filtration structure may be welded by laser welding, hot die welding, or ultrasonic welding. The composite filtration structure includes at least two fluoropolymer membranes positioned adjacent to each other. The fluoropolymer membranes may be positioned in a stacked or layered configuration or they may be laminated together. The fluoropolymer membranes may have bubble points that are different from each other. In exemplary embodiments, the support layer is a woven structure, a nonwoven structure, mesh, a perforated polymeric film, or a knit structure made of thermoplastic materials. In one embodiment, at least one of the fluoropolymer membranes is an expanded polytetrafluoroethylene membrane.

A fourth embodiment of the invention relates to a method of forming a filtration article that includes (1) sealing a composite filtration structure to form a circumferential seal region and form a preform and (2) welding the preform to an outer casing and form an attachment weld where at least a portion of the seal region lies within the attachment weld. The preform may be welded to the outer casing through laser welding, hot die welding, or ultrasonic welding. In exemplary embodiments, the seal region and attachment weld are embedded therethrough with a polymer material. The composite filtration structure includes at least two fluoropolymer membranes positioned adjacent to each other. The fluoropolymer membranes may be positioned in a stacked or layered configuration or they may be laminated together. In at least one embodiment, at least one of the fluoropolymer membranes is an expanded polytetrafluoroethylene membrane.

BRIEF DESCRIPTION OF THE DRAWINGS

The accompanying drawings are included to provide a further understanding of the disclosure and are incorporated in and constitute a part of this specification, illustrate embodiments, and together with the description serve to explain the principles of the disclosure.

GLOSSARY

The term "sterilizing grade filter" as used herein is meant to denote a filtration article that produces sterile effluent after being challenged with microorganisms in accordance with ASTM F838. Alternative microorganisms such as *Brevundimonas diminuta* may be used in this test.

As used herein, the term "integral" is meant to denote that when tested according to the Water Intrusion Test, the filter shows no evidence of leakage that would compromise the ability of the filter to function as a sterilizing grade filter as defined herein.

As used herein, the term "stacked filtration material" is meant to denote a filtration material that contains least two fluoropolymer membranes positioned such that one fluoropolymer membrane is on another fluoropolymer membrane.

The term "nanofiber" as used herein is meant to describe a fiber having a diameter of several nanometers up to about thousands of nanometers.

As used herein, the term "major surface" is meant to describe the top and/or bottom surface along the length of the membrane and is perpendicular to the thickness of the membrane.

As used herein, the term "on" is meant to denote an element, such as a fluoropolymer membrane (e.g., expanded polytetrafluoroethylene (ePTFE) membrane), is directly on another element or intervening elements may also be present.

As used herein, the phrase "distance between contiguous fluoropolymer membranes" is meant to define the distance between two fluoropolymer membranes that are positioned next to each other in a stacked configuration with no intervening elements or membranes therebetween.

As used herein, the term "adjacent" is meant to denote an element, such as a fluoropolymer membrane (e.g., ePTFE membrane), is directly adjacent to another element or intervening elements may also be present.

The term "substantially zero microns" is meant to define a distance that is less than or equal to 0.1 micron.

DETAILED DESCRIPTION

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

The present invention is directed to a filtration article that includes a composite filtration structure, a seal region positioned within the composite filtration structure, and an attachment weld that interconnects the seal region and an outer casing. The composite filtration structure includes at least two fluoropolymer membranes and a support layer. The filtration article is small in size (e.g., 25 mm in diameter) and is lightweight (e.g., less than 6 grams) without sacrificing a high flow.

Figure 1:
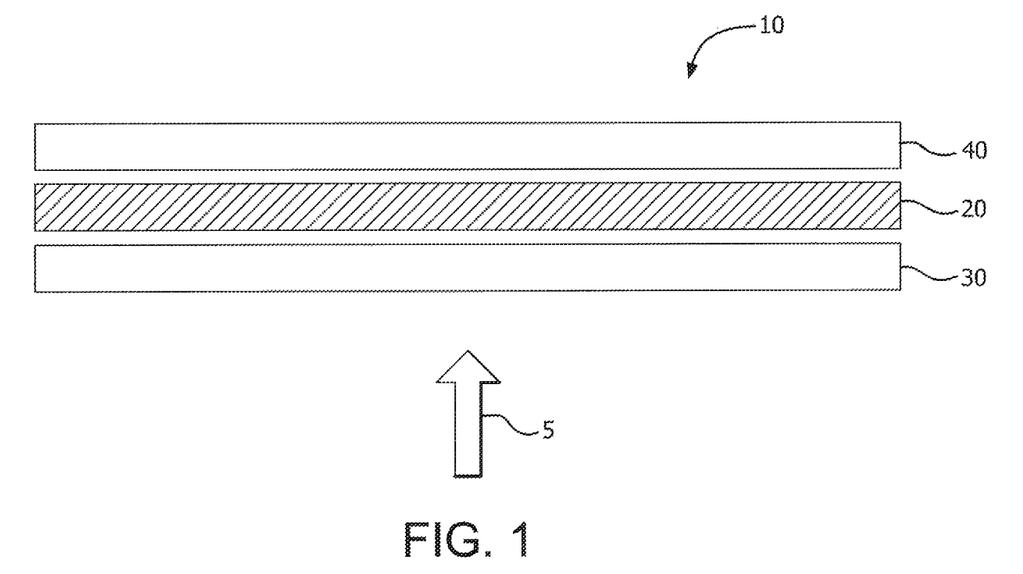
FIG. 1 a schematic illustration of layers of material within a filtration material according to at least one embodiment of the invention.

The composite filtration structure includes a stacked filter material and at least one support layer that is configured to support the stacked filter material and/or is configured to provide drainage of fluid away from the stacked filter material. Additionally, at least one support layer provides a material for imbibing the stacked filter material. FIG. 1 depicts one exemplary orientation of the layers of materials forming the composite filtration structure. As shown, the composite filtration structure 10 may include a stacked filter material 20 and a first support layer 30 forming an upstream drainage layer. Optionally, the composite filtration structure 10 includes a second support layer 40 forming a downstream drainage layer. The arrow 5 depicts the direction of fluid flow through the composite filtration structure.

Figure 2:
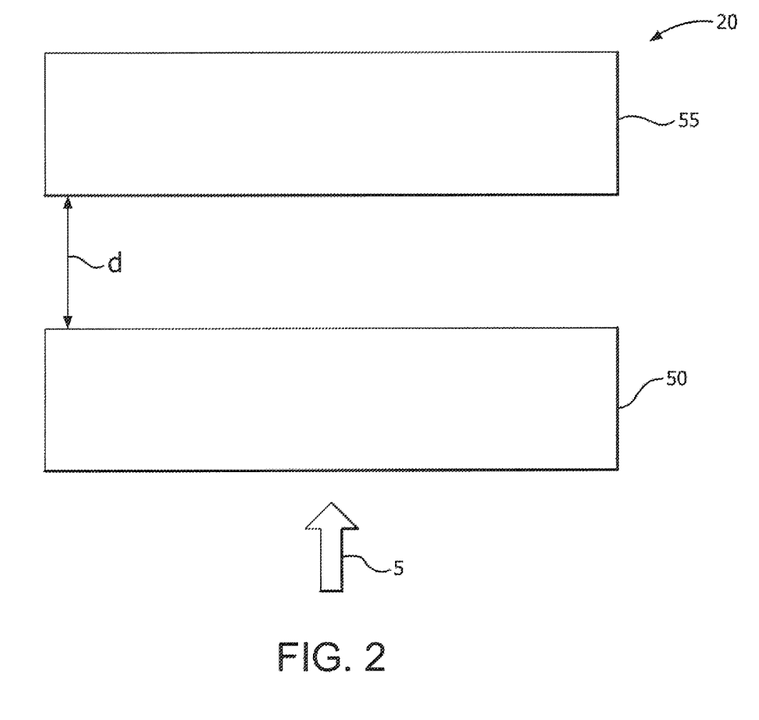
FIG. 2 is a schematic illustration of the orientation of stacked fluoropolymer membranes within the stacked filter material according to at least one embodiment of the invention.

The stacked filter material 20 contains at least two fluoropolymer membranes. These fluoropolymer membranes may be positioned in a stacked or layered configuration as shown generally in FIG. 2, depicting a stacked filter material containing two fluoropolymer membranes. The fluoropolymer membrane 50 is positioned adjacent to or on the fluoropolymer membrane 55 such that material flows through the membranes 50, 55 (illustrated by arrow 5). In one or more exemplary embodiment, the fluoropolymer membrane 50 is separated from fluoropolymer membrane 55 by a distance d. The distance d is the distance between contiguous fluoropolymer membranes. As used herein, the phrase "distance between contiguous fluoropolymer membranes" is meant to define the distance between two fluoropolymer membranes that are positioned next to each other in a stacked configuration with no intervening elements or membranes therebetween. The distance d may range from about 0 microns to about 100 microns, from about 0 microns to about 75 microns, from about 0 microns to about 50 microns, or from about 0 microns to about 25 microns. In some embodiments, the distance d is zero or substantially zero microns. less than or equal to 0.1 microns. The distance may also be less than about 100 microns, less than about 75 microns, less than about 50 microns, less than about 25 microns, less than about 20 microns, less than about 15 microns, less than about 10 microns, less than about 5 microns, or less than about 1 micron.

The fluoropolymer membranes 50, 55 may be positioned in a stacked configuration by simply laying the membranes on top of each other. Alternatively, the fluoropolymer membranes may be stacked and subsequently laminated together using heat and/or pressure. Embodiments employing two fluoropolymer membranes that are co-expanded to produce a composite stacked filter material is also considered to be within the purview of the invention. The composite stacked filter material may contain two or more layers of fluoropolymer membranes that may be co-extruded or integrated together. In such an embodiment, the first fluoropolymer membrane and second fluoropolymer membrane are in a stacked configuration, but the distance between the first and second fluoropolymer membranes is zero or nearly zero. The fluoropolymer membranes 50, 55 filter bacteria from a fluid stream when the membranes 50, 55 are positioned in the fluid stream.

Figure 7:
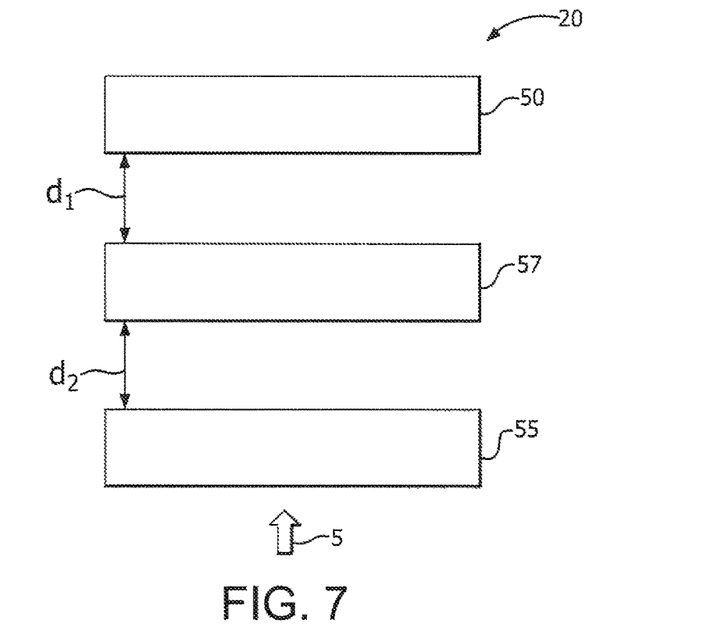
FIG. 7 is a schematic illustration of a stacked filter material containing three fluoropolymer membranes according to at least one embodiment of the invention.

It is to be appreciated that more than two fluoropolymer membranes may form the stacked filter material 20. In one such embodiment depicted generally in FIG. 7, the stacked filter material 20 contains three fluoropolymer membranes 50, 55, and 57. The distance between fluoropolymer membrane 50 and fluoropolymer membrane 57 is designated as d1 and the distance between fluoropolymer membrane 57 and fluoropolymer membrane 55 is designated as d2. It is to be appreciated that d1 and d2 may be the same or different.

Figure 8:
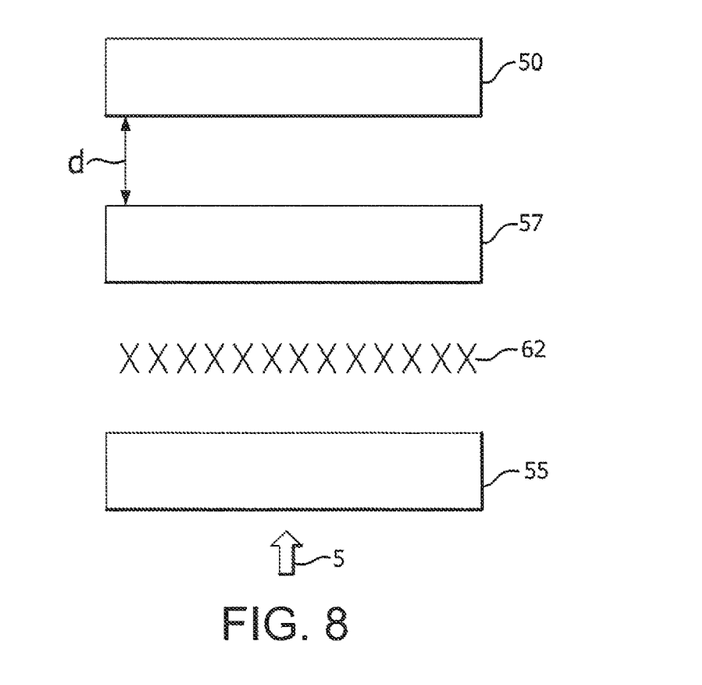
FIG. 8 is a schematic illustration of a stacked filter material that contains a nanofiber pre-filter material in accordance with one embodiment of the invention.

In some embodiments, the stacked filter material 20 may contain intervening layers positioned between the fluoropolymer membranes. For instance, non-woven materials, nanofiber materials, and/or knit materials may be interspersed in the stacked filter element. FIG. 8 depicts a stacked filter material 20 that contains fluoropolymer membranes 50, 55, and 57 as well as a pre-filter material 62 positioned between fluoropolymer membranes 57 and 55. As defined above, the distance d is the distance between contiguous fluoropolymer membranes. Thus, a distance d in FIG. 8 is defined as the distance between fluoropolymer membrane 57 and fluoropolymer membrane 55.

In addition, the fluoropolymer membranes may be derived from the same fluoropolymer source, from different sources, or a combination thereof. Also, some or all of the fluoropolymer membranes may vary in composition, bubble point, thickness, air permeability, mass/area, node and/or fibril geometry or size, density, etc. from each other.

In one or more exemplary embodiment, a porous nanofiber membrane formed of a polymeric material and/or phase inversion membranes may be used in place of, or in addition to, the fluoropolymer membranes in the stacked filter material 20. For example, stacked filter material 20 may include a membrane that is formed of, or includes, nanofibers. As used herein, the term "nanofibers" is meant to describe a fiber that has a diameter of a few nanometers up to thousands of nanometers, but not greater than about 1 micron. The diameter of the nanofiber may range from a diameter greater than zero up to about 1000 nm or a diameter greater than zero up to about 100 nm. The nanofibers may be formed of thermoplastic or thermosetting polymers. Additionally, the nanofibers may be electrospun nanofibers. As one example, the pre-filter 62 depicted in FIG. 8 may be a nanofiber pre-filter (e.g., a porous membrane formed of nanofibers). It is to be understood that a porous nanofiber membrane may be positioned at any location within the stacked filter material 20.

The support layer 30 (and optionally support layer 40) may include a plurality of fibers (e.g., fibers, filaments, yarns, etc.) that are formed into a cohesive structure. The support layer is positioned adjacent to and downstream of the stacked filter material to provide support for the stacked filter material and a material for imbibing the fluoropolymer membranes 50, 55. The support layers 30, 40 may be a woven structure, a nonwoven structure, mesh, or a knit structure made using thermoplastic polymeric materials (e.g., polypropylene, polyethylene, or polyester), thermoset polymeric materials (e.g., epoxy, polyurethane or polyimide), or an elastomer. The thickness of each support layer 30, 40 may range from about 1 micron to about 100 microns, from about 1 micron to about 75 microns, or from about 1 microns to about 50 microns, or from about 1 micron to about 25 microns.

In one or more exemplary embodiment, at least one of the fluoropolymer membranes 50, 55 is a polytetrafluoroethylene (PTFE) membrane or an expanded polytetrafluoroethylene (ePTFE) membrane. Expanded polytetrafluoroethylene (ePTFE) membranes prepared in accordance with the methods described in U.S. Pat. No. 7,306,729 to Bacino et al., U.S. Pat. No. 5,814,405 to Branca, et al., U.S. Pat. No. 3,953,566 to Gore, U.S. Pat. No. 5,476,589 to Bacino, U.S. Pat. No. 5,183,545 to Branca, et al. may be used herein.

The fluoropolymer membrane may also include an expanded polymeric material that includes a functional tetrafluoroethylene (TFE) copolymer material having a microstructure characterized by nodes interconnected by fibrils, where the functional TFE copolymer material includes a functional copolymer of TFE and PSVE (perfluorosulfonyl vinyl ether) or TFE with another suitable functional monomer, such as, but not limited to, vinylidene fluoride (VDF). The functional TFE copolymer material may be prepared, for example, according to the methods described in U.S. Patent Publication No. 2010/0248324 to Xu et al. or U.S. Patent Publication No. 2012/035283 to Xu et al. It is to be understood that throughout the application, the term "PTFE" is meant to include not only polytetrafluoroethylene, but also expanded PTFE, expanded modified PTFE, and expanded copolymers of PTFE, such as described in U.S. Pat. No. 5,708,044 to Branca, U.S. Pat. No. 6,541,589 to Baillie, U.S. Pat. No. 7,531,611 to Sabol et al., U.S. Patent Publication No. 2009/0093602 to Ford, and U.S. Patent Publication No. 2010/0248324 to Xu et al.

In one or more exemplary embodiment, the fluoropolymer layer may be substituted with one or more of the following materials: ultra-high molecular weight polyethylene as taught in U.S. Patent Publication No. 2014/0212612 to Sbriglia; polyparaxylylene as taught in U.S. Provisional Application No. 62/030,419 to Sbriglia; polylactic acid as taught in U.S. Provisional Patent Application No. 62/030,408 to Sbriglia, et al.; VDF-co-(TFE or TrFE) polymers as taught in U.S. Provisional Patent Application No. 62/030,442 to Sbriglia; and alternating poly(ethylene tetrafluoroethylene) as taught in U.S. Provisional Patent Application No. 62/030,448 to Sbriglia.

In addition, the fluoropolymer membrane is thin, having a thickness from about 1 micron to about 100 microns, from about 1 micron to about 75 microns, from about 1 micron to about 50 microns, from about 1 micron to about 25 microns, from about 1 micron to about 25 microns, from about 1 micron to about 10 microns, or from about 1 micron to about 5 microns. Alternatively, the fluoropolymer membrane has a thickness less than about 100 microns, less than about 75 microns, less than about 50 microns, less than about 25 microns, less than about 10 microns, or less than about 5 microns.

The fluoropolymer membranes have a mass/area from about 0.1 $g/m^2$ to about 30 $g/m^2$, from about 0.1 $g/m^2$ to about 25 $g/m^2$, from about 0.5 $g/m^2$ to 20 $g/m^2$, from about 1 $g/m^2$ to about 15 $g/m^2$, from about 1.5 $g/m^2$ to about 10 $g/m^2$, or from about 3 $g/m^2$ to about 5 $g/m^2$. Additionally, the fluoropolymer membrane may be rendered hydrophilic (e.g., water-wettable) using known methods in the art, such as, but not limited to, the method disclosed in U.S. Pat. No. 4,113,912 to Okita, et al.

The bubble point of the fluoropolymer membrane may range from about 10 psi to about 50 psi, from about 14 psi to about 20 psi, or from about 21 psi to about 25 psi. Alternatively, the fluoropolymer membrane may have a bubble point less than about 50 psi, less than about 35 psi, less than about 30 psi, or less than about 25 psi.

Figure 3:
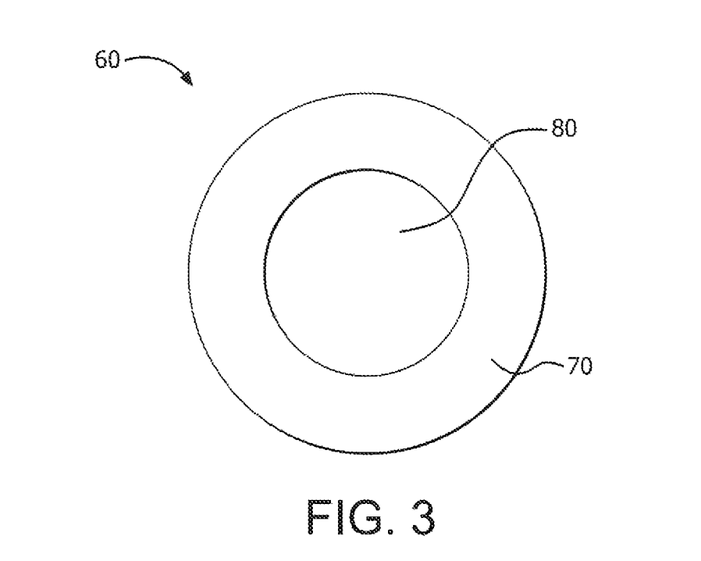
FIG. 3 is a schematic illustration of a preform that includes a stacked filter material and a seal region.

Turning to FIG. 3, the composite filtration structure 10 can be formed into a preform 60 by the application of heat (e.g. impulse heat sealing, hot die or induction) in order to fully imbibe the composite structure with polymer. In at least one embodiment, the heat is applied in a circular manner to create a circular preform 60. When the polymer is in a flowable state, the polymer is permitted to imbibe (e.g., to infiltrate) the heated area within the seal region 70. It is to be understood that other shapes and sizes of the preform 60 are considered within the purview of the invention. The heat may be applied to one or both major surfaces of the composite filtration structure 10. The term "major surface" as used herein is meant to describe the top and/or bottom surface along the length of the membrane and is perpendicular to the thickness of the membrane.

In at least one embodiment, the application of heat to the composite filtration structure 10 melts the polymer material forming the support layer(s) 30, 40 in the area which is heated. In particular, sufficient heat is applied to cause the polymer from which the support layers are fabricated to soften and flow. Once the polymer is hardened (e.g., solidified or cured), the imbibed area forms the seal region 70. In exemplary embodiments, the polymer is imbibed through the thickness of the preform 60. The seal region 70 is imperious to liquid, gas, bacteria, and combinations thereof. In the embodiment shown in FIG. 3, excess fibrous and membrane material of the composite filtration structure 10 has been trimmed away, leaving the seal region 70 surrounding the composite material 80 formed of the composite filtration structure 10. In exemplary embodiments, the diameter of the preform is about 200 mm, about 150 mm, about 100 mm, about 75 mm, about 50 mm, about 30 mm, about 25 mm, about 20 mm, about 15 mm, about 10 mm, or about 5 mm.

Figure 4:
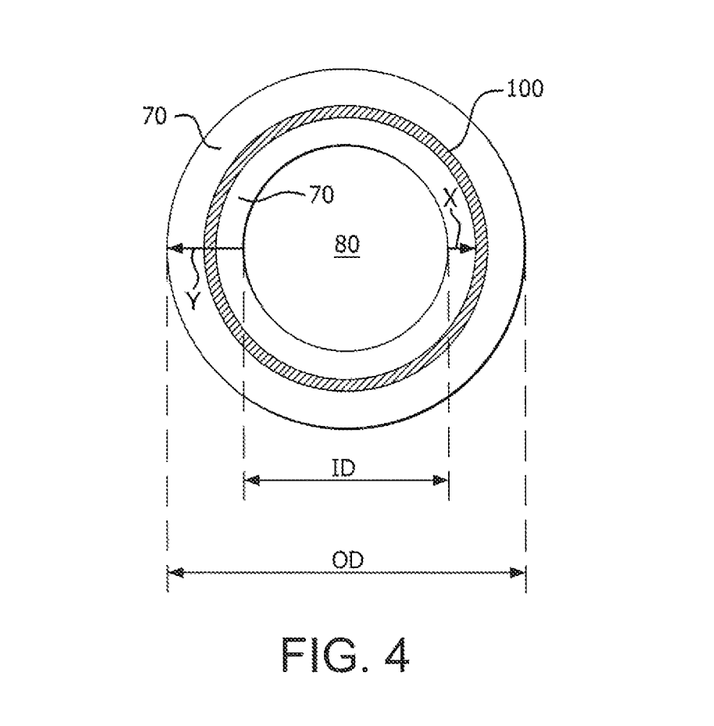
FIG. 4 is a schematic illustration of a filtration article that includes a seal region and a weld region within the seal region.

Next, the preform may be formed into a filtration article 90 suitable for use as a sterilizing grade filter. The preform 60 may be concentrically disposed within an outer casing (not shown in FIG. 4) formed of a thermoplastic or thermoset polymer. In exemplary embodiments, the outer casing is formed of a meltable thermoplastic material such as, but not limited to, polypropylene. The outer casing is configured to fit into conventional filtration devices. Once seated within the outer casing, the preform 60 is welded to the outer casing, forming an attachment weld 100. The preform 60 may be welded to the outer casing, such as, for example, by ultrasonic welding, hot die welding, or laser welding. Alternatively, the preform 60 may be sealed to the outer casing with an elastomeric O-ring by compression. In at least one embodiment, the preform 60 is heated in an area within the seal region 70 to a temperature sufficient to melt the polymer forming the outer casing. Once the polymer is cooled, the solidified polymer in the imbibed area forms the attachment weld 100. The lid (not illustrated) of the outer casing may be ultrasonically welded to the base of the filter casing to form the finished filtration device. The attachment weld may have a width that less than about 5 mm, or from about 0.1 mm to about 5 mm, from about 0.1 to about 4 mm, from about 0.1 mm to about 2 mm, from about 0.1 to about 1 mm, or from about 0.1 to about 0.5 mm.

Figure 5:
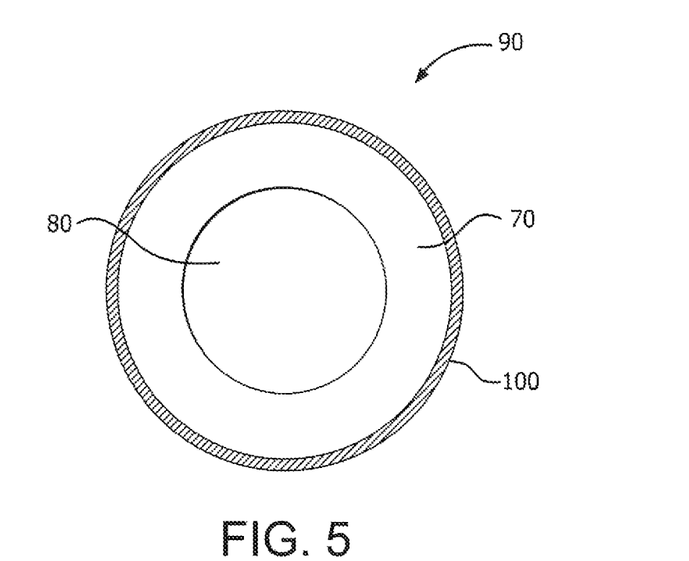
FIG. 5 is a schematic illustration of a filtration article where the weld region is positioned at the outer periphery of the filtration article.
Figure 6:
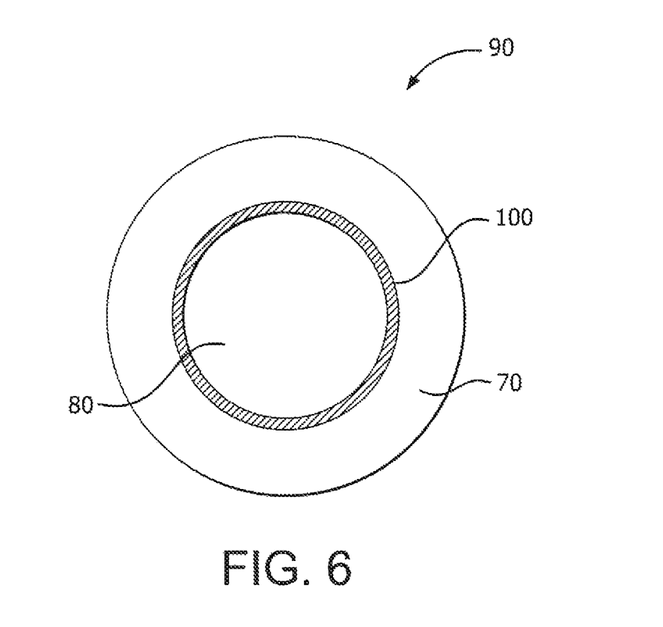
FIG. 6 is a schematic illustration of a filtration article where the weld region is positioned at the inner periphery of the filtration article.

The weld region may be positioned a distance X extending from the outer perimeter of the inner diameter (ID) of the filtration article 90. The distance X may be greater than zero, greater than about 0.5 mm, greater than about 1.0 mm greater than about 5 mm, or greater than about 10 mm. The attachment weld 100 may be positioned at any location within the seal region 70 so long as the distance X is greater than zero and is not greater than the distance Y, which is the distance between the outer periphery of the composite material 80 and the outer periphery of the filtration article 90 along a straight line. In other words, the distance X cannot be greater than the distance obtained by subtracting the inner diameter (ID) from the outer diameter (OD). For example, as shown in FIG. 5, the weld region 100 may be positioned at the outer circumference of the filtration article. However, if the weld region 100 is positioned at distance of zero, such as is shown in FIG. 6, the filter will fail.

Persons skilled in the art will readily appreciate that various aspects of the present disclosure can be realized by any number of methods and apparatus configured to perform the intended functions. It should also be noted that the accompanying drawing figures referred to herein are not necessarily drawn to scale, but may be exaggerated to illustrate various aspects of the present disclosure, and in that regard, the drawing figures should not be construed as limiting.

Test Methods

It should be understood that although certain methods and equipment are described below, other methods or equipment determined suitable by one of ordinary skill in the art may be alternatively utilized.

Water Intrusion Test

The filtration article was tested for integrity according to the water intrusion test methodology using the following test equipment: Model Sartocheck® 4 Test Unit 16288-TU (Sartorius AG). The following parameters were used: Test Stabilization time: 3 mins, Actual Test time: 3 mins. The filtration article was subjected to hydraulic stress induced by pressurizing the upstream side of the article with water pressure of 30 psi for 3 mins. The downstream side of the filtration article was exposed to atmosphere. The fluid flow on the upstream side of the filter was measured using the mass flow controller in the test equipment. A filtration article was determined to be integral if the measured fluid flow was less than 0.06 ml/min.

Air Flow

The air flow (in units of liter/hr) through a sample was measured using the ATEQ D520 tester on a sample with an area of 2.99 $cm^2$ when a differential pressure of 0.174 psi (12 millibar) was applied.

Mass Per Area

Samples die cut to form rectangular sections 2.54 cm by 15.24 cm were measured to determine their mass (using a Mettler-Toledo analytical balance Model AG204). Mass Per Area was calculated by dividing the measured mass by the area of the sample.

Air Permeability

The Frazier permeability reading is the rate of flow of air in cubic feet per square foot of sample area per minute at a differential pressure drop across the test sample of 12.7 mm water column. Air permeability was measured by clamping a test sample into a circular gasketed flanged fixture which provided a circular opening of 17.2 cm diameter (232 $cm^2$ area). The upstream side of the sample fixture was connected to a flow meter in line with a source of dry compressed air. The downstream side of the sample fixture was open to the atmosphere. The flow rate through the sample was measured and recorded as the Frazier number.

Bubble Point

The bubble point was measured according to the general teachings of ASTM F316-03 using a Capillary Flow Porometer (Model 3G zh from Quantachrome Instruments). The sample holder comprised a porous metal plate (Part Number: 04150-10030-25, Quantachrome Instruments), 25.4 mm in diameter and a plastic mask (Part Number ABF-300, Professional Plastics), 25 mm in diameter. The sample was placed in between the metal plate and the plastic mask. The sample was then clamped down and sealed using an O-ring (Part Number: 51000-25002000, Quantachrome Instruments). The sample was wet with the test fluid (Silicone fluid having a surface tension of 19.1 dynes/cm). Using the 3GWin software version 2.1, the following parameters were set as specified in Table 1.

TABLE 1

| | |
|---|---|
| PoreSizeStartPressure | 19.4 psi |
| PoreSizeEndPressure | 58.3 psi |
| PoreSizeStartSize | 0.6 micron |
| PoreSizeEndSize | 0.2 micron |
| NumberWetPoints | 256 |
| NumberDryPoints | 256 |
| UseNormal | FALSE |
| UseTol | FALSE |
| UseTime | FALSE |
| UseRate | FALSE |
| UseLowFlow | FALSE |
| UseXLowFlow | FALSE |
| TimeOut | 3 |
| EquilTime | 0 |
| RunRate | 1 |
| PressureTolerance | 1 |
| FlowTolerance | 5 |
| UseMovAv | FALSE |
| MovAvWetInterval | 7 |
| MovAvDryInterval | 7 |
| LowessDry | 0.01 |
| LowessWet | 0.01 |
| LowessFlow | 0.05 |
| LowessNum | 0.1 |
| UseMinWetDry | FALSE |
| UseMinWetOnly | FALSE |
| UseMinSizeThreshold | FALSE |
| MinSizeThreshold | 0.98 |
| MinSizeWetDryLimit | 1 |
| MinSizeWetOnlyLimit | 0.98 |
| UseWetOnlyCalcs | FALSE |
| MfpCalcOnWetOnly | FALSE |
| UseBpAuto (manual) | 0.5 liter/min |
| UseBpThreshold | TRUE |
| UseBpThresholdPerCm2 | FALSE |
| UseBpThresholdNumber | FALSE |
| BpAutoTolerance (manual) | 0.5 liter/min |
| BpThresholdValue (manual) | 0.5 liter/min |
| BpThresholdPerCm2Value | 0 |

EXAMPLES

Example 1

An expanded polytetrafluoroethylene (ePTFE) composite that included a retentive membrane layer (mass of 0.52 g/m², bubble point of 40.32 psi, air permeability of 5.12 Frazier) and a protective cover layer (mass of 3.3 g/m², bubble point of 8.8 psi, Air permeability of 4 Frazier) was produced by co-expanding the layers together such that the retentive membrane layer was situated in between two protective cover layers. The mass, bubble point and air flow of the resultant composite were measured to be 7.1 g/m², 40.32 psi and 61.25 liter/hr, respectively.

The above described ePTFE composite was laminated to a layer of a spun-bonded polypropylene material (Part Number M3151C from Polymer Group, Inc) using heat and pressure. Another layer of the same material was placed on top of the resultant laminate on the ePTFE membrane side of the laminate.

A circular preform was formed using all of the above described layers by creating a seal region followed by punching out the preform using a die punch. The seal region was created by impulse welding the layers together at the seal region at a temperature of 425° F. (218° C.) for a dwell time of 6 seconds followed by a cooling cycle of 8 seconds at 110° F. (43° C.). A die punch was then used to punch out the circular preform having an outer diameter (OD) of 1.24 inches (3.15 cm) and an inner diameter (ID) of 1.06 inches (2.69 cm). The width of the seal region was 0.18 inches (0.46 cm).

Next, the circular preform was attached to the base of a polypropylene filter casing through an attachment weld within the seal region The attachment weld had a width of 0.045 inches (1.14 mm). The attachment weld was created by heat staking at a temperature of 525° F. (274° C.) for a dwell time of 10 seconds. The attachment weld was positioned 0.03 inches (0.72 mm) from the outer perimeter of the inner diameter. The lid of the filter casing was ultrasonically welded to the base of the filter casing to form the finished filtration article.

The filtration article was tested for integrity using the Water Intrusion Test. The measured fluid flow was less than 0.06 ml/min, indicating that the filtration article was integral (i.e., no leaks were observed).

Example 2

A preformed stack of expanded polytetrafluoroethylene (ePTFE) membranes including a retentive membrane layer is placed between two protective cover layers. This three layer stack is then placed between two layers of a spun-bonded polypropylene material. A filtration article is created from this five layer stack as described in Example 1. The filtration article is integral.

Comparative Example

A filtration article was created according to Example 1, but with the distance D equal to zero as shown in FIG. 6. The filtration article was tested for integrity using the Water Intrusion Test. The measured fluid flow was greater than 0.06 ml/min, indicating that the filtration article was not integral (i.e., leaks were observed).

The invention of this application has been described above both generically and with regard to specific embodiments. It will be apparent to those skilled in the art that various modifications and variations can be made in the embodiments without departing from the scope of the disclosure. Thus, it is intended that the embodiments cover the modifications and variations of this invention provided they come within the scope of the appended claims and their equivalents.

What is claimed is:
1. A filtration article comprising;
a composite filtration structure comprising:
a support layer, and
a stacked filter material comprising at least two fluoropolymer membranes positioned adjacent to each other;

a seal region surrounding said composite filtration structure; and an attachment weld interconnecting said seal region and an outer casing, said attachment weld attaching said composite filtration structure to said outer casing, wherein said attachment weld extends a first distance from an outer periphery of said composite filtration structure and within said seal region, said first distance being greater than zero.

2. The filtration article of claim 1, wherein said at least two fluoropolyrner membranes comprise a first fluoropolyrner membrane and a second fluoropolyrner membrane, said first fluoropolymer membrane being positioned a second distance from said second polymer membrane, said second distance being less than 100 microns.

3. The filtration article of claim 2, wherein said first fluoropolymer membrane has a first bubble point and said second fluoropolymer membrane has a second bubble point, said first bubble point being different from said second bubble point.

4. The filtration article of claim 1, wherein said fluoropolyrner membranes are laminated to each other.

5. The filtration article of claim 1, wherein said stacked filter material further comprises a porous nanofiber membrane, a phase inversion membrane or a combination thereof.

6. The filtration article of claim 1, wherein said seal region and said attachment weld are each embedded therethrough with a polymer material.

7. The filtration article of claim 1, wherein said support layer comprises a polymer material and said seal region and said attachment weld are embedded therethrough with said polymer material.

8. The filtration article of claim 1, wherein said support layer comprises a porous non-woven, woven, mesh or knit thermoplastic or thermoset polymer.

9. The filtration article of claim 1, wherein at least one of said fluoropolymer membranes is an expanded polytetrafluoroethylene (ePTFE) membrane.

10. The filtration article of claim 1, wherein said seal region is impermeable to liquid, gas, bacteria, and combinations thereof.

11. A filtration article comprising:
a composite filtration structure comprising:
   a support layer, and
   a stacked filter material comprising:
      a first fluoropolymer membrane;
      a second fluoropolymer membrane; and
      a third fluoropolymer membrane, said second fluoropolymer membrane being positioned between said first and third fluoropolymer membranes;
a seal region surrounding said composite filtration structure; and
an attachment weld interconnecting said seal region and an outer casing, said attachment weld affixing said composite filtration structure to said outer casing, wherein said second fluoropolymer membrane has a first bubble point and said first and third fluoropolymer membranes have a second bubble point, said first bubble point being different from said second bubble point; and wherein said attachment weld extends a first distance from an outer periphery of said composite filtration structure and within said seal region, said first distance being greater than zero.

12. The filtration article of claim 11, wherein said stacked filter material further comprises a porous nanofiber membrane, a phase inversion membrane, or a combination thereof.

13. The filtration article of claim 11, wherein said stacked filter material further comprises a pre-filter comprising a porous nanofiber membrane.

14. The filtration article of claim 11, wherein said first fluoropolymer membrane, said second fluoropolymer membrane, and said third fluoropolymer membrane are each positioned a second distance from each other, said second distance being less than 100 microns.

15. The filtration article of claim 11, wherein at least two of said first fluoropolymer membrane, said second fluoropolymer membrane, and said third fluoropolymer membrane are laminated to each other.

16. The filtration article of claim 11, wherein said seal region and said attachment weld are each embedded therethrough with a polymer material.

17. The filtration article of claim 11, wherein said support layer comprises a polymer material and said seal region and said attachment weld are embedded therethrough with said polymer material.

18. The filtration article of claim 11, wherein said support layer comprises a porous non-woven, woven, mesh, or knit thermoplastic or thermoset polymer.

19. The filtration article of claim 11, wherein at least one of said fluoropolymer membranes is an expanded polytetrafluoroethylene (ePTFE) membrane.

20. The filtration article of claim 11, wherein said seal region is impermeable to liquid, gas, bacteria, and combinations thereof.

21. A method of forming a filtration article comprising:
constructing a composite filtration structure comprising:
   a support layer, and
   a stacked filter material comprising at least two fluoropolymer membranes positioned adjacent to each other;
sealing said composite filtration structure to form a seal region and form a preform;
placing said preform in an outer casing; and
welding said composite filtration structure to form an attachment weld that extends a first distance from an outer periphery of said composite filtration structure and within said seal region, said first distance being greater than zero.

22. The method of claim 21, wherein said stacked filter material comprises a first fluoropolymer membrane and a second fluoropolymer membrane, said first fluoropolymer membrane being positioned a second distance from said second polymer membrane, said second distance being less than 100 microns.

23. The method of claim 21, wherein said first fluoropolymer membrane has a first bubble point and said second fluoropolyrner membrane has a second bubble point, said first bubble point being different from said second bubble point.

24. The method of claim 21, wherein said fluoropolymer membranes are laminated to each other.

25. The method of claim 21, wherein said stacked filter material further comprises a porous nanofiber membrane, a phase inversion membrane, or a combination thereof.

26. The method of claim 21, wherein said stacked filter material further comprises a pre-filter comprising a porous nanofiber membrane.

27. The method of claim 21, wherein said seal region and said attachment weld are each embedded therethrough with a polymer material.

28. The method of claim 21, wherein said support layer comprises a polymer material and said seal region and said attachment weld are embedded therethrough with said polymer material.

29. The method of claim 21, wherein said welding comprises laser welding or ultrasonic welding.

30. A method of forming a filtration article comprising:
   sealing a composite filtration structure to form a circumferential seal region and form a preform; and
   welding said preform to an outer casing and form an attachment weld,
   wherein said at least a portion of said seal region lies within said attachment weld, and
   wherein said composite filtration structure comprises:
      a support layer, and
      a membrane layer comprising at least two expanded fluoropolymer membranes positioned adjacent to each other.

31. The method of claim 30, wherein said composite filter material comprises a first fluoropolymer membrane and a second fluoropolymer membrane, said first fluoropolymer membrane being positioned a distance from said second polymer membrane, said distance being less than 100 microns.

32. The method of claim 31, wherein said first fluoropolymer membrane has a first bubble point and said second fluoropolymer membrane has a second bubble point, said first bubble point being different from said second bubble point.

33. The method of claim 30, wherein said fluoropolymer membranes are laminated to each other.

34. The method of claim 30, wherein said membrane layer further comprises a porous nanofiber membrane, a phase inversion membrane, or a combination thereof.

35. The method of claim 30, wherein said membrane layer further comprises a pre-filter comprising a porous nanofiber membrane.

36. The method of claim 30, wherein said support layer comprises a polymer material and said seal region and said attachment weld are embedded therethrough with said polymer material.

37. The method of claim 30, wherein said seal region and said attachment weld are each embedded therethrough with a polymer material.

38. The method of claim 30, wherein said welding comprises laser welding or ultrasonic welding.

* * * * *